United States Patent
Erfort et al.

(10) Patent No.: US 7,940,230 B2
(45) Date of Patent: May 10, 2011

(54) METHOD AND SYSTEM FOR DEPICTING DIGITAL DISPLAY ELEMENTS

(75) Inventors: Markus Erfort, München (DE); Helmut Mair, München (DE); Ralph Schweyer, Gröbenzell (DE); Thomas Thiel, Eggstätt (DE)

(73) Assignee: Infoscreen Gesellschaft fur Staftinformationsanlagen mbH, Munich (DE)

( * ) Notice: Subject to any disclaimer, the term of this patent is extended or adjusted under 35 U.S.C. 154(b) by 788 days.

(21) Appl. No.: 10/566,186

(22) PCT Filed: Jul. 29, 2003

(86) PCT No.: PCT/EP03/08366
§ 371 (c)(1),
(2), (4) Date: Jan. 26, 2006

(87) PCT Pub. No.: WO2005/022376
PCT Pub. Date: Mar. 10, 2005

(65) Prior Publication Data
US 2007/0109214 A1 May 17, 2007

(51) Int. Cl.
*G09G 5/00* (2006.01)
(52) U.S. Cl. .......... 345/1.1; 709/204
(58) Field of Classification Search ........... 345/1.1–3.4; 709/201–211; 725/9–21, 37–61
See application file for complete search history.

(56) References Cited

U.S. PATENT DOCUMENTS

| | | | | |
|---|---|---|---|---|
| 6,073,727 A * | 6/2000 | DiFranza et al. | | 187/396 |
| 6,288,688 B1 | 9/2001 | Hughes et al. | | 345/1 |
| 6,384,801 B1 * | 5/2002 | Takahashi | | 345/1.1 |
| 6,670,934 B1 * | 12/2003 | Muoio et al. | | 345/1.1 |
| 2002/0007987 A1 * | 1/2002 | Amo et al. | | 187/391 |

* cited by examiner

*Primary Examiner* — Alexander S Beck
*Assistant Examiner* — Liliana Cerullo
(74) *Attorney, Agent, or Firm* — Roberts Mlotkowski Safran & Cole, P.C.; David S. Safran

(57) ABSTRACT

Disclosed is a method for depicting digital display elements ($a_{1-n}$, $b_{1-n}$, $c_{1-n}$, $d_{1-n}$) on a number of display devices (1) that occurs in a temporarily and/or spatially coordinated manner. In order to depict display elements in a chronologically coordinated manner. At least one display computer device (4) and a control computer device (3) are provided, and at least one display device (1) is assigned to each display computer device. At least one display element and/or one reference to the display element and at least one item of control information ($t_a$, $t_b$, $t_c$, $t_d$) are transmitted to the control computer device (3). The control computer device generates at least one control command ($x_a$, $x_b$, $x_c$, $x_d$) from the item of control information. Based on the control command from the display computer device (4), signals (5) are generated from the file, which contains or depicts the display elements, and are transmitted to the respectively assigned display device (1).

14 Claims, 1 Drawing Sheet

METHOD AND SYSTEM FOR DEPICTING DIGITAL DISPLAY ELEMENTS

CROSS-REFERENCES TO RELATED APPLICATIONS

This application is a National Stage of International Application PCT/EP2003/008366, filed Jul. 29, 2003, and which claims priority to PCT Application No. PCT/EP2003/008366, filed Jul. 29, 2003, entitled "METHOD AND SYSTEM FOR DEPICTING DIGITAL DISPLAY ELEMENTS", which is hereby incorporated by reference in its entirety.

BACKGROUND OF THE INVENTION

The subject matter of the present invention relates to a method and a system for visualizing digital display elements on a plurality of display devices wherein the visualization of display elements takes place in a chronologically and spatially coordinated manner on a first display device and the visualization of display elements on at least one additional display device and wherein the display elements are connected to one another.

The present invention relates to the area of digital information systems in which texts, images and videos or acoustic information are visualized by means of computers as display elements on displays and/or are output on an acoustic display device in a manner attuned to one another. For the display, the texts, images and videos are available predominantly or exclusively in digital form. To be able to visualize digital display elements on a display device, such as a monitor or screen, the digital information must first be transformed by a computer display device, i.e., a (multimedia) computer dedicated to the display and having relevant software, into signals for the display device. As a rule, these signals have a graphic card and/or acoustic card format. If a plurality of display devices are to display the same digital information at the same time, it suffices for the image and/or sound signal generated by the computer display device to be reproduced via so-called Y-switches and to be transmitted to the display devices that are connected to the computer display device.

On the other hand, it is considerably more complicated if digital display elements are to be visualized on a plurality of display devices, all of which are connected to the dedicated computer display device, in a chronologically coordinated manner, i.e., in a manner attuned to one another. In addition to transforming the digital display elements to be visualized into image and/or sound signals for the display devices that are connected to the computer display device, it is necessary to specify the chronological sequence of the signals and the target address that must be maintained to ensure a chronologically and/or spatially coordinated visualization of the information to be visualized on the respective display devices.

In the prior art, if a plurality of different digital display elements were to be visualized at different times on the display devices that are connected to the computer display device, the display elements intended for visualization, together with the respective information that specifies the time or location of visualization, had to be analyzed by the computer display device in order to prepare a time sequence plan. The time sequence plan determined which specific information to be visualized was to be displayed at which time and on which display device and/or in which manner.

Specifying or controlling the chronological sequence of the display elements that are to be visualized on the respective display devices and, in particular, generating the image and/or sound signals is computationally very complex. This computational complexity is responsible for the fact that the image quality or the resolution of the display elements visualized on a display device is extremely limited. The use of computer display devices with a greater computing capacity would entail a considerably higher cost of investment.

The problem to be solved by the present invention is to make available a method and a system for the visualization of digital display elements, by means of which method and system it is simple and inexpensive to visualize the display elements with high accuracy and chronologically attuned to one another on a plurality of display devices without the disadvantages listed above.

To solve the problem defined above, a method according to the present invention of the type discussed earlier provides that a minimum of one computer display device, preferably a plurality of computer display devices, and one control computer device that is connected to the computer display devices be made available and that each computer display device have a minimum of one display device dedicated to it, with a minimum of one display element in a file format and/or a minimum of one reference to a file containing or representing the display element and a minimum of one control information being transmitted to the control computer device, with the control information determining the point in time and/or the location of the display of the display element on a display device, with the control computer device generating a minimum of one control command from the control information, with the display element and/or the reference and the control command being transmitted by the control computer device to the computer display device, and with signals in a graphic card and/or acoustic card format being generated as a result of the control command by the computer display device from the file containing the display element and being transmitted to the respective dedicated display device.

In contrast to prior-art methods for the chronologically and/or spatially coordinated visualization of display elements on a plurality of display devices, the method according to the present invention provides that the specification of the chronological sequence of the digital display elements that are to be visualized in a coordinated manner on a plurality of display devices and the transformation of the information to be visualized into input signals for the respective display devices take place on two different computer devices independent of the program and preferably also independent of the hardware. This has the advantage that the computing capacity required to generate control commands for specifying the chronologically coordinated sequence of the digital display elements to be visualized on the respective display devices is provided by the control computer device while making it possible for the computing capacity of the computer display device to be fully utilized to carry out the transformation of the display elements existing in a file format into image and/or sound signals for the display devices. The point in time at which a computer display device transmits a signal to a specific display device to visualize the digital display elements and the target address by means of which the location of the display is identified are determined by a minimum of one control command that is generated by the control computer device and transmitted to the computer display device.

The control command provides the computer display device with information about the point in time at which an image and/or sound signal is/are to be generated from the display element on hand in a file format and is/are to be transmitted to the display device to ensure that the display element is visualized or displayed at a specific point in time in the specific location on the display device desired. To implement this, the control computer device is connected to all computer display devices. Each computer display device is preferably connected to a display device. In such a case, it is possible to visualize, in a coordinated manner, the digital display elements on all display devices that are connected to the control computer device via the computer display devices.

But in principle it is also possible for a computer display device to be connected to a plurality of display devices, thus making it possible to visualize the same digital information or display elements at the same time on all display devices that are connected to the computer display device. To implement this, for example, a prior-art Y-switch of the type described earlier can be used to reproduce the image and/or sound signals generated by the computer display device and to transmit said signals to the display devices that are connected to the computer display device. In addition, so-called splitter computers can be disposed downstream of the computer display device, which splitter computers make it possible to distribute, in a coordinated manner, input signals in the graphic card format with limited resolution to a number of different display devices.

A display element can be anything which, when visualized on the display device, is perceived by the viewer as a unit, e.g., a commercial comprising a plurality of sequences, but also any files that are combined to form a unit, e.g., images or MPEGs of a commercial. A digital display element can invariably contain both graphic and acoustic elements, but in the simplest case, a display element can be a single piece of graphic and/or acoustic information.

The display elements and/or references thereto are preferably transmitted together with the control command by the control computer device to the computer display device. The computer display device simply serves to generate image and/or sound signals from the display elements on hand in one file or a plurality of files. The simultaneous transmission of the control commands together with the coordinated digital display elements has the advantage that the computer display device, as soon as it receives the control command, can immediately generate the signals for the display device, without the need for saving or storing the display elements on the computer display device.

It is, however, also possible for the display elements to be saved or stored as a file in the memory of a storage device of the computer display device. In this case, the transmission of the control command is independent of the transmission of the display element files. As soon as the control command has been transmitted to the computer display device, the display element files associated with the control command can be loaded from the memory of the computer display device. This is of particular advantage in cases in which the same display elements on the computer display device are to be transformed a number of times into signals for the display device or in which a rapid data transmission is desired.

And finally the control computer device can be made to transmit a digital reference or a path specification together with the control command to the computer display device, in which case the reference of the computer display device enables access to a file containing the display element. In such a case, the display elements to be visualized can be stored, for example, in a memory of the control computer device and/or in an external central memory. This is especially useful in cases in which large quantities of data are to be visualized.

The control command generated by the control computer device can be transmitted to the computer display device as a single control command or in combination with a plurality of additional control commands in a control command block. The transmission as a control command block is useful, for example, when parallel effects or a "blinking light" effect is desired during the display of the display elements. The control commands and/or the display elements and/or the references can be transmitted both to the control computer device and to the computer display device in the form of a file or in the form of network packages. It should moreover also be noted that a plurality of display devices can be configured in a spatial interconnection in a manner readily visible to a viewer. In this situation, the invention is especially useful and important.

According to an especially preferred embodiment of the invention, a plurality of display elements and/or references and control information are compiled in a play list and said play list or individual display elements and/or references and control information are transmitted to the control computer device. In the play list, the display elements to be visualized over a predetermined period of time can be shown in the form of a sequence plan. After the transmission of the play list to the control computer device, said play list is analyzed by the control computer device and, in accordance with the chronological and/or spatial coordination of the display elements to be visualized within the play list, control commands are and/or references are generated for the display of the display elements compiled in the play list and transmitted to the computer display devices. Preferably, the play list is also available in the form of a file format, with the possibility of easily generating different play lists for different display devices and different times of display from a so-called master play list.

The computer display devices and the control computer devices are preferably integrated into a network, for example, into an intranet. The transmission of information between the control computer device and the computer display device is preferably carried out via a permanent or continuous information transmission line.

To visualize the same digital display elements and/or program blocks on at least two display devices, it is possible according to the present invention to store the same display device on at least two computer display devices or to transmit the same display elements to at least two computer display devices. To simultaneously visualize the same information on the display devices, the same control commands can also be transmitted by the control computer device to the relevant computer display devices.

The chronological and/or spatial coordination of the information to be visualized or of the display elements can be implemented in different ways. Preferably, the control command is transmitted as close in time to, i.e., immediately prior to, the desired display of the display element. In the simplest case, the control command is an instruction to the computer display device, such as "Now display display element x." To ensure that loading the display elements does not lead to a delay in the active memory of the computer display device, the control computer device can use a so-called load command to transmit the display elements and thus make them available in the active memory of the computer display device even prior to the specified time of display. In this case, the control command "Load display element x" is transmitted for each display element a certain time in advance and the additional control command "Now display display element x" is subsequently transmitted in time for the playing time. It is also possible to configure the control command in such a way that a display command is transmitted simultaneously with a load command and that on transmission, information that specifies the delay in time until the display element is to be displayed is transmitted at the same time. In this case, the control command reads, for example, "Now load digital display element x and display display device x after lapse of time y."

In addition, it is also possible for the computer display devices to be synchronized to a reference time and for a control command to cause an image and/or sound signal to be generated from a display element file at a predetermined time relative to the reference time. Irrespective of the potential combination with the control command that causes the display element to be loaded, the control command that causes the signal to be transmitted and/or the display element to be visualized on the display device is provided with an absolute time marker or is referenced to the reference time. To ensure the coordinated visualization of the display elements on the various display devices, it is necessary to use an absolute time marker in order to synchronize the computer devices involved in the system to the timer marker selected or to the reference time.

To enable the chronological coordination of the display elements to be visualized on the display devices with a higher degree of accuracy, it is possible according to the present invention to provide that the time between the beginning of the transmission of a control command and/or the end of the procedure of loading the display element and/or the transmission of an image and/or sound signal and/or the visualization of the display element on the display device be automatically determined and, during future transmissions, to be automatically taken into consideration by means of some type of a closed-loop control system. In this context, it is useful to ensure that during the transformation of the display elements to be visualized into signals and/or during the visualization of the display elements on the relevant display device, a control signal can be transmitted to the control computer device. The point in time at which the display elements are visualized during future transmissions on the relevant display device can thus be controlled as a function of the period of time determined and/or of the control signal transmitted, The display devices are preferably visibly configured in a spatial interconnection, with the coordinated visualization of the digital information being immediately visible to a viewer. For example, a plurality of display device can be configured in a series, with specific image elements being displayed on various display devices. It is thus possible to visualize display patterns on the display devices that are disposed in a spatial interconnection. For example, at time $t_1$, the first, the third and the fifth display device can display a red image while a green image is visualized on the second, the fourth and the sixth display device. At time $t_2$, the reverse color pattern is to be displayed on these six spatially interconnected display devices. According to a second simple example, a graphic display element, such as a red image, passes within a short time from the first to the last display device. The coordinated sequences of the display elements to be visualized and/or of a play list can be as complex as desired.

In principle, however, it is also possible for a plurality of display devices to be disposed separately from one another in several rooms or in different locations. For example, in a first room, a viewer can view a first sequence of a film at time $t_1$ and a second sequence of the film in a second room at time $t_2$. In this case, the difference in time between the playing time of the first sequence and that of the second sequence can preferably be precisely adjusted to the average period of time that it takes the viewer to walk from the first room to the second room. Thus, in spite of the different rooms, the viewer will see a seemingly continuous sequence of the film.

BRIEF SUMMARY OF THE INVENTION

The invention relates to a method for depicting digital display elements ($a_{1-n}$, $b_{1-n}$, $c_{1-n}$, $d_{1-n}$) on a number of display devices (1) during which the depiction of display elements on a first display device and on a minimum of one additional display device occurs in a chronologically and/or spatially coordinated manner. In order to depict display elements in a chronologically coordinated manner, at least one display computer device (4) and a control computer device (3) connected to the display computer device, are provided. At least one display device (1) is assigned to each display computer device. At least one display element and/or one reference to the display element and at least one item of control information ($t_a$, $t_b$, $t_c$, $t_d$) are transmitted to the control computer device (3). The control computer device generates at least one control command ($x_a$, $x_b$, $x_c$, $x_d$) from the item of control information. Based on the control command ($x_a$, $x_b$, $x_c$, $x_d$) from the display computer device (4), signals (5) are generated from the file, which contains or depicts the display element ($a_{1-n}$, $b_{1-n}$, $c_{1-n}$, $d_{1-n}$), and are transmitted to the respectively assigned display device (1).

One object of the present invention is to provide an improved method for depicting digital display elements.

Related objects and advantages of the present invention will be apparent from the following description.

DETAILED DESCRIPTION OF THE INVENTION

Figure 1:
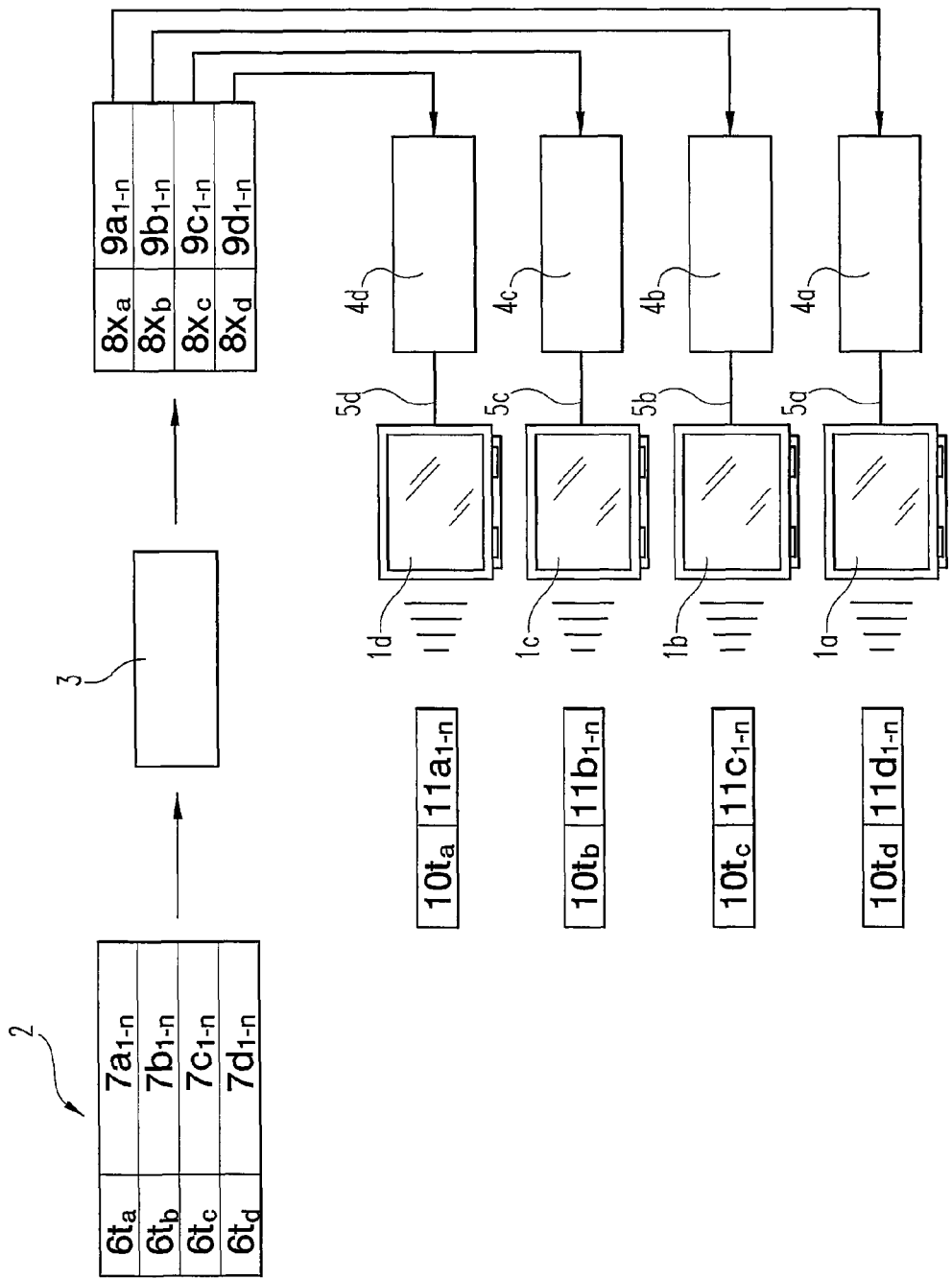
FIG. 1 is a flow chart illustrating one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, this drawing shows a simplified representation of an embodiment of the method according to the present invention for visualizing digital display elements $7a_{1-n}$, $7b_{1-n}$, $7c_{1-n}$, $7d_{1-n}$ on a plurality of display devices 1a-1d (collectively 1). The elements $7a_{1-n}$, $7b_{1-n}$, $7c_{1-n}$, $7d_{1-n}$ can be, for example, individual texts, videos or images or combinations thereof and sequences therefrom which are compiled for future playing along the lines of a program in a play list 2. Play list 2 is a file in which the display elements $7a_{1-n}$, $7b_{1-n}$, $7c_{1-n}$, $7d_{1-n}$ or references thereto are contained in a file format. Play list 2 is compiled along the lines of a sequence plan, in which a control information $6t_a$, $6t_b$, $6t_c$, $6t_d$ is dedicated to each display element $7a_{1-n}$ to $7d_{1-n}$, Control information $6t_a$ to $6t_d$ specifies at which point in time and on which display device 1 a display element $7a_{1-n}$ to $7d_{1-n}$ is to be displayed. In addition, said control information can also contain the position on the screen and the overlay effect for the display elements.

According to the embodiment shown in the drawing, play list 2 is transmitted to a control computer device 3. The control computer device 3 analyzes play list 2, with the control computer device 3 generating a relevant control command $8x_a$ to $8x_d$ from each control information $6t_a$ to $6t_d$, which control command, like the relevant control information, specifies at which point in time and on which display device 1 the individual display elements are to be displayed.

In addition, via the control command, it is possible to control the position on the screen and the overlay effect for the individual display elements. The control computer device 3 transmits the display elements $9a_{1-n}$, $9b_{1-n}$, $9c_{n-1}$, $9d_{1-n}$ together with the generated control commands $8x_a$ to $8x_d$ to a plurality of computer display devices 4a-4d (collectively 4). Based on the control command $8x_a$ to $8x_d$, the relevant computer display device 4 generates from the file containing the display element $9a_{1-n}$, $9b_{1-n}$, $9c_{1-n}$, $9d_{1-n}$ image and/or sound signals 5 for the display or output of the display elements $11a_{1-n}$, $11b_{n-1}$, $11c_{1-n}$, $11d_{1-n}$ which are subsequently transmitted to the properly dedicated display device 1. This ensures that the chronological coordination of the display elements $7a_{1-n}$, $7b_{1-n}$, $7c_{1-n}$, $7d_{1-n}$ specified in the play list is properly taken into consideration while the display elements $11a_{1-n}$, $11b_{1-n}$, $11c_{1-n}$, $11d_{1-n}$ are being played. This means that the display elements $7a_{1-n}$, $7b_{1-n}$, $7c_{1-n}$, $7d_{1-n}$ contained in play list 2 will be displayed or output at a predetermined time according to a predetermined sequence plan. Thus, the chronological and/or spatial coordination of the display elements $7a_{1-n}$, $7b_{1-n}$, $7c_{1-n}$, $7d_{1-n}$ is simple and can be easily implemented. For the sake of clarity, display elements $7a_{1-n}$ to $7d_{1-n}$, $9a_{1-n}$ to $9d_{1-n}$, and $11a_{1-n}$ to $11d_{1-n}$ are separately identified to indicate the various progression of the display elements through the disclosed system. However, it should be understood that the components may represent the same text, video and/or images data. Similarly, $6t_a$ to $6t_d$ and $10t_a$ to $10t_d$ may represent the same point in time in which the display elements are to be displayed on display device 1.

The control computer device 3 can control one or a plurality of computer display devices 4. Although not shown in the drawing, it is in principle also possible to provide that in cases in which there is a plurality of computer display devices, one of these assume the function of the control computer device for all other computer display devices. To implement this, the control computer device 3 and the relevant computer display devices 4 have appropriate data processing programs, i.e., the software for the control computer device 3 is a so-called play list analyzer and the software for the computer display devices 4 is a so-called element player.

In this manner, the play list analyzer can control one or a plurality of element players. In principle, the play list analyzer and the element players can be installed as independent programs on the same computer or the same computer device. Preferably, however, the play list analyzer is installed on a separately dedicated computer. This ensures that the computer with the play list analyzer and each computer with an element player use the technically maximum available capacity for each task and, if needed (e.g., during repairs), can be easily replaced.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. A method for the visualization of a sequenced presentation of digital display elements ($a_{1-n}$, $b_{1-n}$, $c_{1-n}$, $d_{1-n}$) on a plurality of display devices (1), wherein the visualization of display elements ($a_{1-n}$, $b_{1-n}$, $c_{1-n}$, $d_{1-n}$) on a first display device (1) which is located in a first location and the visualization of display elements ($a_{1-n}$, $b_{1-n}$, $c_{1-n}$, $d_{1-n}$) on at least one additional display device (1) which is located in at least one second location takes place in a chronologically and spatially coordinated manner, wherein said at least one additional display device is visually coordinated with said first display device, characterized in in the steps of:
   providing a plurality of display computer devices (4), and a control computer device (3) connected to said display computer devices (4), wherein each display computer device (4) is associated with a minimum of one display device (1), and the plurality of display devices (1) are arranged in a freely configurable order with respect to location, but are chronologically coordinated in timing with respect to each other, the chronological coordination of the display elements being set with a difference in time between a first point in time in which any one display element of the sequenced presentation is visible in said first location and a second point in time in which a sequentially next display element of the sequenced presentation is visible in said at least one second location that is equal to an average time it takes a viewer to travel between the first location and said at least one second location so as to enable the viewer traveling between said first location and said at least one second location to view the sequenced presentation in an essentially complete and continuous manner;
   transmitting a minimum of one display element ($a_{1-n}$, $b_{1-n}$, $c_{1-n}$, $d_{1-n}$) in a file format and a minimum of one control information ($t_a$, $t_b$, $t_c$, $t_d$) to the control computer device (3) in a sequence plan (2);
   said control information ($t_a$, $t_b$, $t_c$, $t_d$) specifying the point in time and the location of the display of the display elements ($a_{1-n}$, $b_{1-n}$, $c_{1-n}$, $d_{1-n}$) on a display device of the plurality of display devices (1);
   said control computer device (3) analyzing said sequence plan (2) and generating a minimum of one control command ($x_a$, $x_b$, $x_c$, $x_d$) from the control information ($t_a$, $t_b$, $t_c$, $t_d$);
   said control computer device (3) transmitting the display element (1) and the control command ($x_a$, $x_b$, $x_c$, $x_d$) to the display computer device (4);
   transforming the display elements ($a_{1-n}$, $b_{1-n}$, $c_{1-n}$, $d_{1-n}$) from the file containing the display element ($a_{1-n}$, $b_{1-n}$, $c_{1-n}$, $d_{1-n}$), which display elements are available in digital form, as a result of the control command ($x_a$, $x_b$, $x_c$, $x_d$) by the display computer device (4) into signals (5) in a graphic card format in order to display the display element ($a_{1-n}$, $b_{1-n}$, $c_{1-n}$, $d_{1-n}$) on the display device (1) and to transmit it to the associated display device (1);
   said control command ($x_a$, $x_b$, $x_c$, $x_d$) specifying the point in time at which the display computer device (4) transmits a signal (5) and the display device to which the signal (5) is to be transmitted; and
   said display computer device (4) serving exclusively to generate an image signal from the digital display elements.

2. The method of claim 1, characterized in that said sequence plan is a play list (2) and in that a plurality of display elements ($a_{1-n}$, $b_{1-n}$, $c_{1-n}$, $d_{1-n}$) and control information ($t_a$, $t_b$, $t_c$, $t_d$) are compiled in said play list (2) and that said play list (2) is transmitted to the control computer device (3).

3. The method of claim 2, characterized in that said play list (2) is analyzed by the control computer device (3), with control commands ($x_a$, $x_b$, $x_c$, $x_d$) being generated for the display of the display elements ($a_{1-n}$, $b_{1-n}$, $c_{1-n}$, $d_{1-n}$) compiled in said play list (2).

4. The method of claim 1, characterized in that the display computer device (4) and the control computer device (3) are integrated into a network.

5. The method of claim 1, characterized in that the same display elements ($a_{1-n}$, $b_{1-n}$, $c_{1-n}$, $d_{1-n}$) are transmitted to a minimum of two display computer devices (4).

6. The method of claim 1, characterized in that the control command ($x_a$, $x_b$, $x_c$, $x_d$) is transmitted close to the time of the desired display of the display element ($a_{1-n}$, $b_{1-n}$, $c_{1-n}$, $d_{1-n}$) to the display computer device (4).

7. The method of claim 1, characterized in that a first control command causes a file containing the display element ($a_{1-n}$, $b_{1-n}$, $c_{1-n}$, $d_{1-n}$) to be loaded on the display computer device (4) and that a second control command causes the signal (5) to be transmitted by the display computer device (4) to the display device (1) and causes the display element ($a_{1-n}$, $b_{1-n}$, $c_{1-n}$, $d_{1-n}$) to be displayed on the display device (1).

8. The method of claim 7, characterized in that said first control command and said second control command are transmitted so as to be staggered by a period of time, with said second control command causing the signal (5) to be transmitted and the display element ($a_{1-n}$, $b_{1-n}$, $c_{1-n}$, $d_{1-n}$) to be displayed on the display device (1) after a predetermined period of time has elapsed after the transmission of the second control command.

9. The method of claim 7, characterized in that said first control command and said second control command are transmitted simultaneously, with said second control command causing the signal (5) to be transmitted and the display element ($a_{1-n}$, $b_{1-n}$, $C_{1-n}$, $d_{1-n}$) to be displayed on the display device (1) after a predetermined period of time has elapsed after the transmission of the second control command.

10. The method of claim 7, characterized in that the plurality of display computer devices (4) are synchronized to a reference point in time and that the second control command causes the signal (5) to be transmitted at a predetermined time.

11. The method of claim 1, characterized in that the period of time between a beginning of the transmission of the control command and the transmission of the signal (5) is automatically determined.

12. The method of claim 1, characterized in that during the display of the display element ($a_{1-n}$, $b_{1-n}$, $c_{1-n}$, $d_{1-n}$) on the display device (1), a control signal is transmitted to the control computer device (3).

13. The method of claim 11, characterized in that the point in time at which the display element ($a_{1-n}$, $b_{1-n}$, $c_{1-n}$, $d_{1-n}$) is displayed on the display device (1) is controlled by the control computer device (3) as a function of a control signal.

14. The method of claim 1, characterized in that during the generation of the signal (5), a control signal is transmitted to the control computer device (3).

* * * * *